United States Patent Office 3,490,920
Patented Jan. 20, 1970

3,490,920
METHOD OF IMPROVING THE WHIPPING AND SETTING PROPERTIES OF MARSHMALLOW USING GLYCOLS
Donald P. Grettie, Portland, Oreg., and Peter J. Tiemstra, La Grange, Ill., assignors to Swift & Company, Chicago, Ill., a corporation of Illinois
No Drawing. Filed May 25, 1966, Ser. No. 552,697
Int. Cl. A23g 3/00
U.S. Cl. 99—134                                     5 Claims

ABSTRACT OF THE DISCLOSURE

Method of preparing an improved gelatin-containing marshmallow formulation comprising incorporating therein a minor amount of a glycol and/or polyglycol additive. A minor amount of a polyphosphate may also be added. Resulting product possesses low density and improved whipping and setting properties.

---

This invention relates to improvements in the preparation of marshmallows and to improved products resulting therefrom.

Marshmallow is prepared by whipping a sugar syrup into a colloidal foam. In order to stabilize the foam prepared, a small amount of gelatin, usually from about 1.4% to about 3.0% is added in order to obtain the desired stability.

The desired properties of a good marshmallow formulation and product are (1) fast whipping qualities, (2) minimum density, (3) fast setting qualities, (4) stable foams, that is foams which have a minimum leakage, and (5) tenderness.

Various materials have been employed in order to enhance the above properties in marshmallow formulations. Materials which have been attempted in the past include esters of phosphoric acid, esters of organic acids, inositol-phosphoric acid condensation products, sorbitol and glycerine. While these materials are usually of some value, they have been observed either to give only a limited improvement in one of the above properties and/or to result in a concurrent decrease in one or more of the other desired properties of the marshmallow formulation.

There is a continuing need in the industry for improved marshmallow formulations, particularly formulations which result in a marshmallow product of a lower density than those heretofore obtainable.

Therefore, it is an object of the present invention to provide a method for preparing improved marshmallows.

It is a further object of the present invention to provide a process for preparing a marshmallow having a low density.

It is another object of the present invention to provide an improved marshmallow product.

Additional objects if not specifically set forth herein will be readily apparent to those skilled in the art from the following detailed description of the invention.

Generally, the present invention relates to improvements obtained by the incorporation into marshmallow formulations of a minor amount of a material selected from the group consisting of dihydroxy alcohols containing at least 3 carbon atoms and related polyglycols having a molecular weight of from about 76 to about 500. In addition, the present invention also relates to preferred results obtained when using these compounds in combination with polyphosphates in marshmallow formulations.

Of the dihydroxy alcohols suitable in the present invention, the lower molecular weight glycols having at least 3 carbon atoms have been found to be most effective, with propylene glycol and 1,3-dihydroxy butane being examples of the preferred glycols. Glycols such as diethylene, dipropylene and polyethylene or polypropylene glycols having up to an average molecular weight of 400 are also suitable for the purposes of the present invention. To the contrary, however, ethylene glycol is not effective in the present invention, nor are the tri- and higher polyhydric alcohols, such as glycerol and sorbitol. In the selection of the suitable glycol one must consider the aspects of toxicity and general suitability for incorporation into food products.

Polyglycols suitable in the present invention are the liquid polyglycols including propylene glycol, trimethylene glycol, ethylene butylene glycol and dipropylene glycol and their polyethers having molecular weights up to about 500. Polyglycols having a molecular weight of from about 76 to about 134 are preferred in the present invention. Usually the alkyl alcohols such as glycol ethers having not substantially in excess of about 7 glycol units will be preferred.

The following examples are presented for the purpose of illustration only and are not to be construed as limiting the scope of the invention.

EXAMPLE I

In order to test the effectiveness of various polyhydric alcohols, the following materials were whipped together for six minutes in order to prepare a marshmallow:

|  | Grams |
|---|---|
| Sugar (sucrose) | 240 |
| Corn syrup | 120 |
| Gelatin | 7.5 |
| Water | 120 |

In addition to the above formulation, various other formulations were prepared using the same amounts of material and adding thereto 4% (basis gelatin) of various polyhydric alcohols.

The result of these tests are set forth in Table 1, wherein the density of the marshmallow is expressed in the conventional term "pounds per gallon."

TABLE 1

| Additive: | Density (lbs./gal.) |
|---|---|
| Control | 3.20 |
| Propylene glycol | 3.03 |
| Sorbitol | 3.25 |
| Glycerol | 3.20 |
| Ethylene glycol | 3.20 |
| 1,3-dihydroxybutane | 3.07 |

In addition to the above additives, it has been noted through experimentation that no monohydric alcohol appears to be effective for the present purpose.

EXAMPLE II

As illustrated by the above table, propylene glycol is the preferred additive for the present invention. In order to determine the optimum percentage of propylene glycol that should be employed, different marshmallow samples having the above stated formulation, but with varying amounts of propylene glycol, were prepared. The following table sets forth the results obtained by this experiment. As in the preceding table, the percent additive is based upon the gelatin present in the formulation and the density of the marshmallow as expressed in pounds per gallon.

TABLE 2

| Additive | Density (lbs./gallon) | Set* 10 min. | 30 min. |
|---|---|---|---|
| Gelatin | 3.20 | None | 10.8 |
| 1% Propylene Glycol | 3.10 | 23.0 | 10.8 |
| 2% Propylene Glycol | 3.06 | 22.3 | 7.4 |
| 3% Propylene Glycol | 3.05 | 17.5 | 6.2 |
| 4% Propylene Glycol | 3.03 | | |
| 13% Propylene Glycol | 2.92 | | |

*The rate of set was determined by measuring the depth of penetration of a one-half inch in diameter plunger weighing 52 grams into the marshmallow in 10 seconds after the marshmallow had been allowed to set in 30 milliliter beakers for 10 and 30 minutes. The depth of penetration is expressed in millimeters.

From the above experiments it has been found that the preferred results of the present invention are obtained when using up to about 2% propylene glycol (basis gelatin). Although higher percentages of propylene glycol are applicable to the present invention and increase the whipping properties of the marshmallow formulation, there is an increased tendency at the higher levels for the marshmallow formulation to leak syrup, i.e., synerese.

The above results generally hold true for the other lower dihydric alcohols tested, and in general, levels of up to about 2% of these materials is also preferred.

EXAMPLE III

The following table illustrates the effectiveness of various polyglycols suitable in the present invention. Here again, the enumerated percentages of the various materials were added to different samples of the above described marshmallow formulation.

Table 3

| Additive: | Density (pounds/gallon) |
|---|---|
| Control | 3.20 |
| 4% diethylene glycol | 3.03 |
| 4% Carbowax 200 (4.13 polyethylene glycol) | 2.77 |
| 4% Carbowax 400 (6.4 polyethylene glycol) | 2.93 |
| 4% dipropylene glycol | 2.85 |
| 4% polypropylene 150 (2.27 polypropylene) | 2.96 |
| 4% polypropylene 425 (7.0 polypropylene glycol) | ¹2.90 |
| 4% Carbowax 350 (methoxy polyethylene glycol) | 3.25 |
| 4% polyglyceride | 3.25 |

¹ Fluid non-setting foam.

As the lower polyethylene glycols are quite toxic, the dipropylene glycol is of primary interest from a commercial standpoint in mashmallow formulations. Dipropylene glycol has about the same physiological effects as propylene glycol. It is obvious that the additive must be one which is edible or provides a non-toxic residue in the product. An investigation was made to determine the optimum levels of dipropylene glycol to be used in marshmallow formulation. The marshmallow formulation was the same as above described. The results obtained are set forth in the following table.

TABLE 4

| Additive | Density (lbs./gallon) | Set 10 min. | 30 min. |
|---|---|---|---|
| Control | 3.20 | No set | 11.7 |
| 1% dipropylene glycol | 3.00 | No set | 9.5 |
| 1.3% dipropylene glycol | 2.92 | 25.0 | 7.4 |
| 2% dipropylene glycol | 2.92 | 7.3 | 5.4 |
| 3% dipropylene glycol | 2.90 | 6.6 | 5.2 |
| 4% dipropylene glycol | 2.84 | 8.1 | 6.1 |
| 5% dipropylene glycol | 2.75 | No set | 6.0 |
| 6% dipropylene glycol | 2.70 | No set | 6.1 |
| 50% dipropylene glycol | 2.37 | No set | No set |

From the above table it is seen that levels of dipropylene glycol of up to about 3% are preferred in the present invention. Although higher percentages of dipropylene glycol are effective in promoting the improved whipping properties, these formulations containing the higher percentages become less and less stable as the percent of dipropylene glycol is increased. As a commercial formulation, it has been found that for the overall preferred product an amount of about 1.5% (basis gelatin) of dipropylene glycol is preferred.

It has been observed that preferred results may be obtained in the present invention by combining the above-noted diglycols and polyglycols with a polyphosphate, particularly a hexametaphosphate.

EXAMPLE IV

In order to illustrate the synergistic results obtained by combining a polyphosphate with a dihydric alcohol, the following samples were prepared using varying percentages of propylene glycol with 2% sodium hexametaphosphate (basis gelatin).

TABLE 5

| Additive | Density (lbs./gallon) | Set 10 min. | 30 min. |
|---|---|---|---|
| Control | 3.20 | 0 | 8.4 |
| 2% polyphosphate | 2.86 | 7.0 | 5.4 |
| 2% polyphosphate+0.7% propylene glycol | 2.78 | 5.6 | 5.0 |
| 2% polyphosphate+1% propylene glycol | 2.80 | 6.2 | 4.6 |
| 2% polyphosphate+1.5% propylene glycol | 2.78 | 5.3 | 5.4 |
| 2% polyphosphate+2% propylene glycol | 2.78 | 6.3 | 5.0 |
| 2% tripolyphosphate+2% propylene glycol | 2.81 | 9.0 | 6.2 |
| 2% tetrapyrophosphate+2% propylene glycol | 2.80 | 7.5 | 5.6 |

Set times in the above table are expressed in millimeters and are obtained by the procedure described in Example I.

When Table 5 is compared with Table 2, which shows the effect of increased levels of propylene glycol, it is apparent that a definite synergistic effect exists when using diglycols in combination with the hexametaphosphates. In particular, it should be noted that the lower amounts of propylene glycol in Table 2, when used alone show only slight effects on the whipping properties, whereas these lower percentages when used in combination with polyphosphates show a marked increase in the whipping properties.

In general, it has been found that up to about 3.0% of polyphosphate is suitable in the present invention, with the ratio of polyphosphate to dihydric alcohol or polyglycol being from about 3:1 to about 1:2. As a preferred embodiment, a percentage of polyphosphate (basis gelatin) of from about 1.5% to about 2.7% should be employed with from about 1.5% to about 4.0% (basis gelatin) of dihydroxy alcohol or polyglycol being employed therewith.

Obviously many modifications and variations of the invention as hereinbefore set forth may be made without departing from the spirit and scope thereof, and therefore only such limitations should be imposed as are indicated in the appended claims.

We claim:
1. A method for improving the whipping and setting properties of gelatin-containing marshmallow formulations, comprising: incorporating in said formulation from about 0.7% to about 4.0%, basis the weight of the gelatin employed in said formulation, an agent selected from the group consisting of dihydroxy alcohols having at least 3 carbon atoms, polyglycols having a molecular weight of from about 76 to about 500, and mixtures thereof; and incorporating in said formulation from about 1.5% to about 3.0%, basis the weight of said gelatin, a polyphosphate, the ratio of polyphosphate to dihydroxy alcohol or polyglycol being from about 3:1 to about 1:2.

2. The method of claim 1, wherein the agent is propylene glycol.

3. The method of claim 1, wherein the agent is dipropylene glycol.

4. The method of claim 1, wherein the agent is 1,3-dihydroxy butane.

5. The method of claim 1, wherein the polyphosphate is selected from the group consisting of sodium hexametaphosphate, tripolyphosphate and tetrapyrophosphate.

References Cited

UNITED STATES PATENTS 2,196,300  4/1940  Grettie _____ 99—130

OTHER REFERENCES

Excerpts from an Atlantic Gelatin (Div. of General Foods) Pamphlet, pp. 11–13.

RAYMOND N. JONES, Primary Examiner

W. C. LAWTON, Assistant Examiner

U.S. Cl. X.R.

99—130